(12) United States Patent
Mikami (10) Patent No.: US 8,482,809 B2
(45) Date of Patent: Jul. 9, 2013

(54) IMAGE READING APPARATUS WITH FUNCTION OF CORRECTING FOR VARIATION OF LIGHT DISTRIBUTION

(75) Inventor: Ryo Mikami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 716 days.

(21) Appl. No.: 12/764,710

(22) Filed: Apr. 21, 2010

(65) Prior Publication Data

US 2010/0302602 A1 Dec. 2, 2010

(30) Foreign Application Priority Data

May 26, 2009 (JP) .................................. 2009-126821
Mar. 11, 2010 (JP) .................................. 2010-055123

(51) Int. Cl.
*H04N 1/00* (2006.01)
(52) U.S. Cl.
USPC ............... 358/406; 358/474; 358/463; 399/9; 399/47
(58) Field of Classification Search
USPC ................. 358/406, 448, 463, 468, 474, 475, 358/480, 488, 497, 498; 399/9, 47, 52
See application file for complete search history.

(56) References Cited

U.S. PATENT DOCUMENTS

| 2007/0109605 A1* | 5/2007 | Shimizu ........................ 358/3.26 |
| 2007/0285690 A1* | 12/2007 | Matsuda et al. ................ 358/1.9 |
| 2009/0244657 A1* | 10/2009 | Arima .......................... 358/483 |
| 2010/0118352 A1* | 5/2010 | Ishiguro et al. ............... 358/463 |

FOREIGN PATENT DOCUMENTS

| JP | 2004-289385 | 10/2004 |
| JP | 2006-148259 | 6/2006 |

* cited by examiner

*Primary Examiner* — Kimberly A Williams
(74) *Attorney, Agent, or Firm* — Fitzpatrick, Cella, Harper & Scinto (57) ABSTRACT

A correction value determination unit determines a light quantity correction value for each main scanning position of each original based on a reading value obtained by an image reading unit reading a reference member. An anomaly detection unit detects, based on the light quantity correction value with respect to the preceding original and the light quantity correction value with respect to the succeeding original, an anomaly in the correction value, and specifies a main scanning position at which the anomaly occurs. A modification unit modifies a reading value at the main scanning position at which the anomaly occurs, out of reading values obtained from the reference member with respect to the succeeding original, or a correction value for the main scanning position at which the anomaly occurs, out of light quantity correction values with respect to the succeeding original.

10 Claims, 6 Drawing Sheets

IMAGE READING APPARATUS WITH FUNCTION OF CORRECTING FOR VARIATION OF LIGHT DISTRIBUTION

BACKGROUND OF THE INVENTION

1. Field of the Invention

The present invention relates to an image reading apparatus, and particularly to a technique that corrects for a variation in light quantity from a light source in an image reading apparatus.

2. Description of the Related Art

In image reading apparatus in general, shading correction is performed in order to correct for differences between outputs from an image sensing element at different main scanning positions or for differences in the quantity of light from a light source at different main scanning positions. Shading correction is performed by reading a white reference plate whose density is controlled and managed so as to be uniform.

Meanwhile, in recent years, there is a demand for continuous reading of a large number of originals. It may take several minutes to several tens of minutes to read a large number of originals. The longer the reading time, the longer the time for which the light source is driven. If the driving time of the light source increases, the quantity of light in a middle phase or a later phase of reading may vary relative to the quantity of light in an early phase of reading. The temporal variation of light quantity may occur not only with rare gas fluorescent lamps but also with LED arrays. It should be noted that the quantity of light may decrease at a constant rate irrespective of the main scanning position or may decrease at different rates depending on the main scanning position. In particular, the former situation may occur when only a temporal variation of light quantity occurs, and the latter situation may occur when a temporal variation of light quantity and a spatial variation of light quantity occur. The spatial variation of light quantity sometimes is called a variation of light distribution.

Generally, the white reference plate is provided in a position different from a position at which an image is read (image reading position). Therefore, the white reference plate cannot be read during continuous reading. To address this issue, Japanese Patent Laid-Open No. 2006-148259 proposes correcting for a variation of light quantity based on the results of reading the surface of a platen roller provided in the image reading position at constant intervals, instead of the white reference plate.

The invention disclosed in Japanese Patent Laid-Open No. 2006-148259 is very advantageous because the variation of light quantity can be corrected for without interrupting continuous reading. However, there is a risk of miscorrection if the surface of the platen roller or a platen glass is contaminated with ink or the like. This is because of the assumption that the surface of the platen roller is always maintained at the same density. Accordingly, the invention disclosed in Japanese Patent Laid-Open No. 2006-148259 may not be able to sufficiently deal with such unexpectedly occurring contamination of the surface of the platen roller.

SUMMARY OF THE INVENTION

Thus, it is a feature of the present invention to solve at least one of this and other problems. For example, it is a feature of the present invention to accurately correct for variation of light quantity even when a reference member to be used during continuous reading is contaminated. It should be noted that the other problems will be made clear upon reading through this specification.

An image reading apparatus includes, for example, a transparent member having transparency, a light irradiation unit, an image reading unit, a reference member, a correction value determination unit, an anomaly detection unit, and a modification unit. The light irradiation unit irradiates light toward the transparent member. The image reading unit has reading elements aligned in a main scanning direction, which is a direction orthogonal to a conveying direction of an original, and reads an image of the original that is conveyed over the transparent member. The reference member is provided such that the transparent member is provided between the light irradiation unit and the reference member. The correction value determination unit determines a light quantity correction value for each main scanning position of each original based on a reading value obtained by the image reading unit reading the reference member. It should be noted that, in a case of continuous reading of a plurality of originals, the reference member is read between when a trailing edge of a preceding original passes through an image reading position and when a leading edge of a succeeding original reaches the image reading position. The anomaly detection unit detects, based on the light quantity correction value with respect to the preceding original and the light quantity correction value with respect to the succeeding original, an anomaly in the correction value, and specifies a main scanning position at which the anomaly occurs. Upon detection of an anomaly by the anomaly detection unit, the modification unit modifies a reading value at the main scanning position at which the anomaly occurs, out of reading values obtained from the reference member with respect to the succeeding original, or a correction value for the main scanning position at which the anomaly occurs, out of light quantity correction values with respect to the succeeding original.

Further features of the present invention will become apparent from the following description of exemplary embodiments with reference to the attached drawings.

BRIEF DESCRIPTION OF THE DRAWINGS

FIG. 9 is a diagram for explaining sample regions, reading values, a process for averaging the reading values, and so on.

DESCRIPTION OF THE EMBODIMENTS

Embodiment 1

Figure 1:
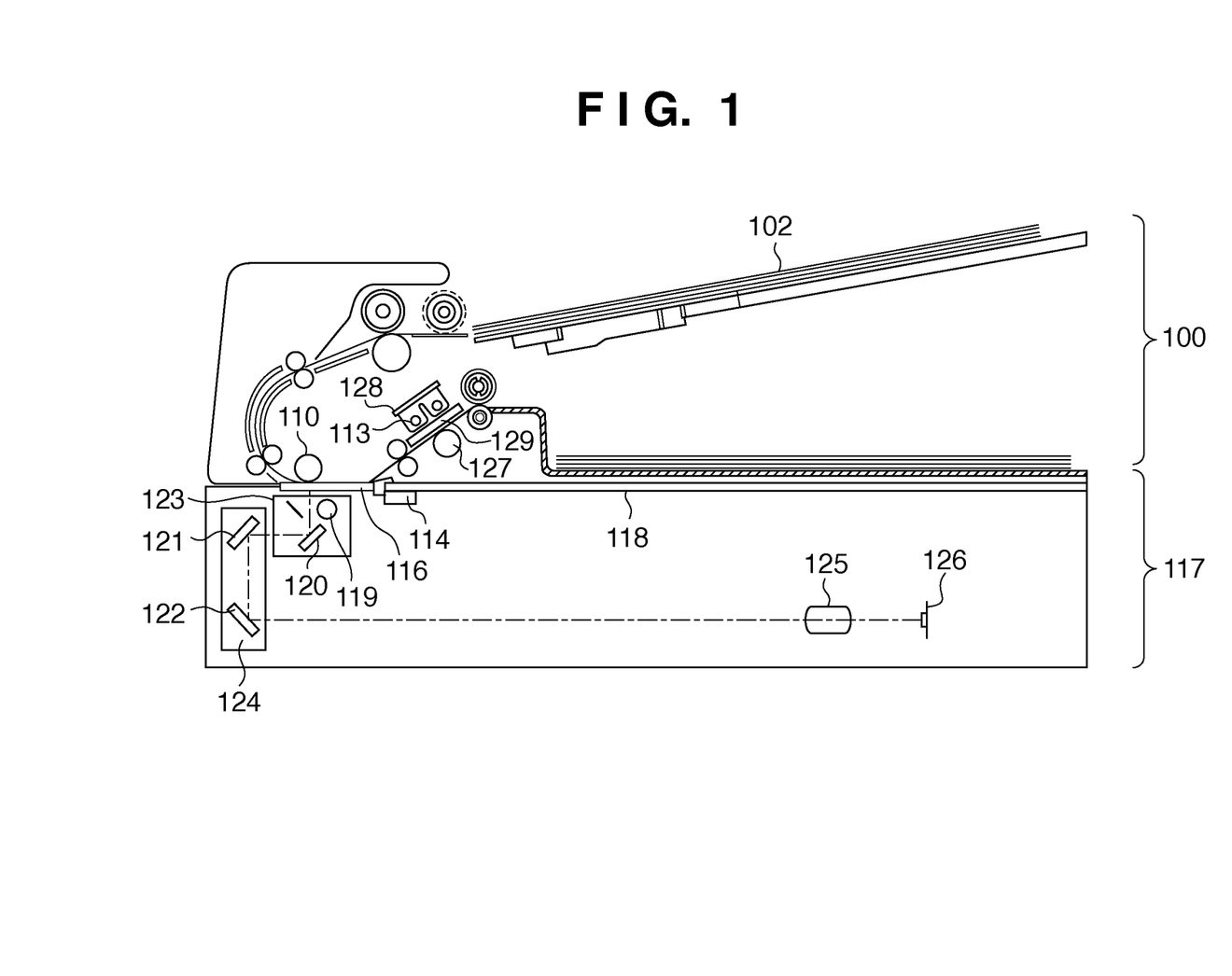
FIG. 1 is a diagram schematically showing the configuration of an image reading apparatus according to an embodiment of the present invention.

FIG. 1 is a diagram schematically showing the configuration of an image reading apparatus according to an embodiment of the present invention. The image reading apparatus is configured of an automatic original feeder 100 and an image reading apparatus main body 117. The automatic original feeder 100 is an apparatus for conveying an original 102 to the image reading position.

In the case where the original 102 is moved while a front surface thereof is being read, the original 102 is conveyed to a flowing document reading glass 116. A platen roller 110 for conveying the original 102 while pressing it is disposed opposite the flowing document reading glass 116. A CCD line sensor 126 reads an image of the original 102 that is conveyed over the flowing document reading glass 116. A lamp 119 irradiates light toward the flowing document reading glass 116 in order to illuminate the original's surface. The lamp 119 is a light source such as a rare gas fluorescent lamp or an LED array. In particular, in the case of an LED array, a plurality of LEDs constituting the array may emit different quantities of light, which is a factor causing the variation of light distribution.

In the case where the original 102 is moved while a back surface thereof is being read, the original 102 is conveyed to a flowing document reading glass 129. A platen roller 127 for conveying the original 102 while pressing it is disposed opposite a CIS 128. CIS is an abbreviation for contact image sensor. The CIS 128 reads an image of the original 102 that is conveyed over the flowing document reading glass 129. A lamp 113 irradiates light toward the flowing document reading glass 129 in order to illuminate the original's surface. The lamp 113 is a light source such as a rare gas fluorescent lamp or an LED array.

It should be noted that the flowing document reading glasses 116 and 129 are examples of a transparent member having transparency. The lamps 113 and 119 are examples of a light irradiation unit that irradiates light toward the transparent member. The CCD line sensor 126 and the CIS 128 are examples of an image reading unit that reads an image of an original that is conveyed over the transparent member. The CCD line sensor 126 is a line sensor that includes a plurality of reading elements aligned in a main scanning direction, which is a direction orthogonal to a conveying direction of the original (sub-scanning direction), and reads an image on a line-by-line basis. The platen rollers 110 and 127 are examples of a reference member that is provided such that the transparent member is provided between the light irradiation unit and the reference member. Therefore, a white material having a controlled density is employed as the material for the surface of the platen rollers 110 and 127. Moreover, the platen rollers 110 and 127 are examples of a press member for pressing the original against the transparent member. Furthermore, the platen rollers 110 and 127 are examples of a roller for conveying the original. It should be noted that in addition to a roller, a plate-like member may also be used as the reference member.

The image reading apparatus main body 117 includes a first mirror base 123, a second mirror base 124, a lens 125, and the CCD line sensor 126. The first mirror base 123 has the lamp 119 and a first mirror 120. The second mirror base 124 is provided with a second mirror 121 and a third mirror 122. Light output from the lamp 119 is reflected by the front surface of the original 102. The light reflected from the original 102 is guided to the CCD line sensor 126 by the first mirror 120, the second mirror 121, the third mirror 122, and the lens 125.

In a flowing document reading mode, the first mirror base 123 and the second mirror base 124 are fixed just under the flowing document reading glass 116. On the other hand, in a fixed document reading mode, the first mirror base 123 and the second mirror base 124 move parallel to an original platen glass 118, and an image of the original fixed on the original platen glass 118 is read. In the flowing document reading mode or the fixed document reading mode, shading correction is performed by reading a white reference plate 114.

The moving direction of the first mirror base 123 and the second mirror base 124 in the fixed document reading mode (a rightward direction in FIG. 1) is generally called the sub-scanning direction. Moreover, the direction orthogonal to the sub-scanning direction is called the main scanning direction. The CCD line sensor 126 and the CIS 128 include a plurality of photodetectors (image sensing elements) arranged in the main scanning direction. The CCD line sensor 126 photoelectrically converts the reflected light forming an image thereon and outputs an electrical signal according to the quantity of incident light. Similarly, the CIS 128 photoelectrically converts reflected light from the original 102 with the photodetectors and outputs an electrical signal according to the quantity of incident light.

Figure 2:
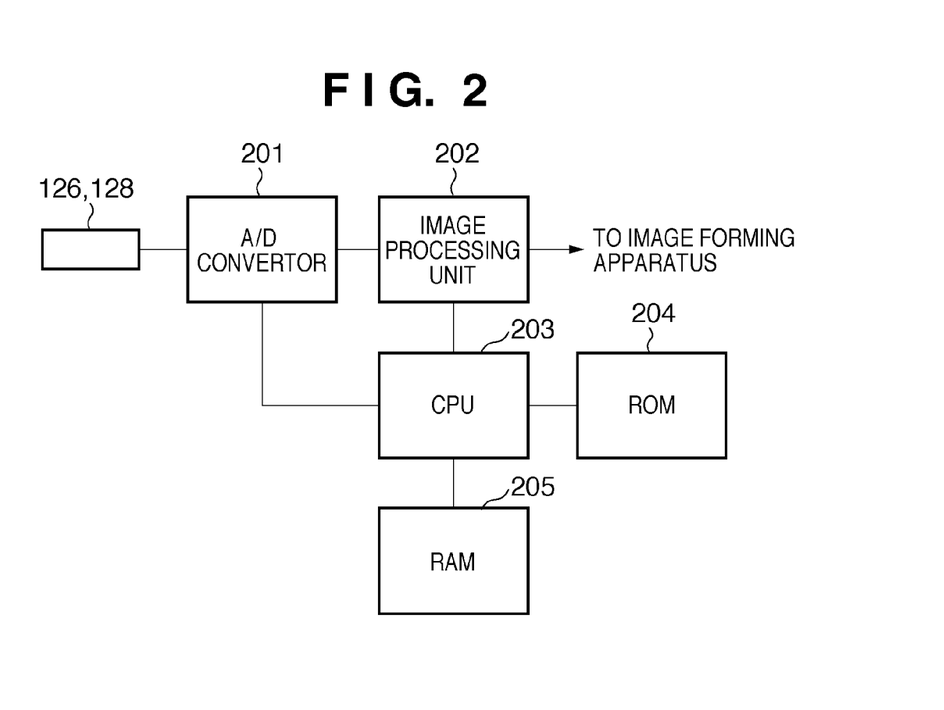
FIG. 2 is a block diagram of an image processing circuit of the image reading apparatus.

FIG. 2 is a block diagram of an image processing circuit of the image reading apparatus. An electrical signal (analog values) output from an image sensor such as the CCD line sensor 126 or the CIS 128 is converted into image data of digital values by an A/D convertor 201. The image data is input to an image processing unit 202, where the image data undergoes image processing such as shading correction and, furthermore, is converted into an 8-bit signal, which is then output to an image forming apparatus. In particular, a CPU 203 sets different shading correction values for different main scanning positions based on reading values obtained by the CCD line sensor 126 reading the white reference plate 114. Reading of the white reference plate 114 in the flowing document reading mode is performed only once before continuous reading of a plurality of originals is started, and not performed each time an original of the plurality of originals is read. The image processing unit 202 corrects data of pixels aligned in the main scanning direction in accordance with the shading correction values.

The CPU 203 controls each unit of the image reading apparatus in an integrated manner in accordance with a control program stored in a ROM 204. A RAM 205 functions as a work area for the CPU 203. In particular, the CPU 203 determines light quantity correction values for each original based on reading values obtained by the CCD line sensor 126 or the CIS 128 reading the platen roller 110 or 127. Reading of the platen roller in the flowing document reading mode is performed before continuous reading of a plurality of originals is started and each time an original of the plurality of originals is read (between successive originals). The light quantity correction values include a light quantity correction value for each main scanning position. The calculated correction values for respective main scanning positions are held in the RAM 205. The image processing unit 202 corrects the image data after the shading correction for the variation of light distribution, based on the light quantity correction values.

As described above, if the platen roller 110 or 127 is unexpectedly contaminated during continuous reading of a plurality of originals, the quantity of light of the reflected light varies. This variation of light quantity reduces the accuracy of the correction values. Thus, the CPU 203 detects, based on a light quantity correction value with respect to a preceding original and a light quantity correction value with respect to a succeeding original, an anomaly in the correction value. When an anomaly has been detected, the CPU 203 modifies the light quantity correction value with respect to the succeeding original, and the image processing unit 202 corrects for the variation of light distribution using the modified correction value.

Figure 3:
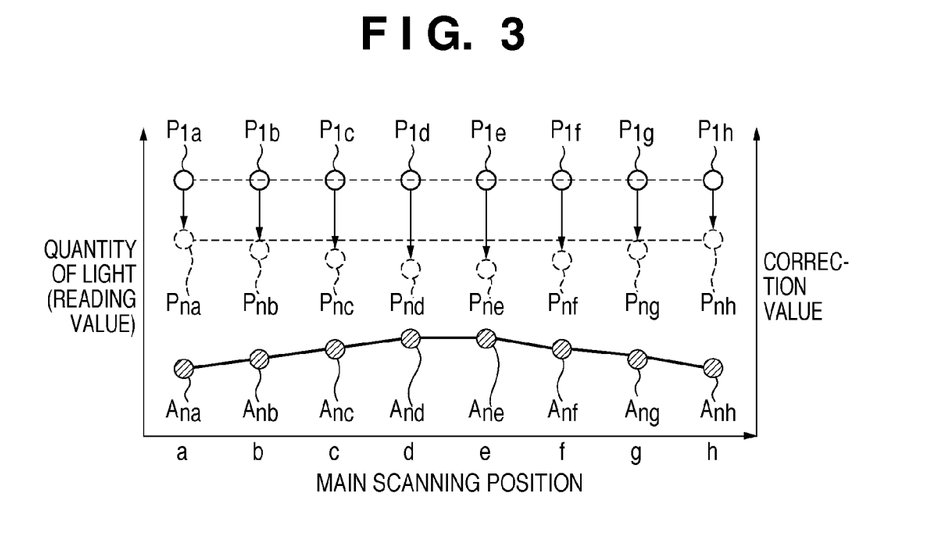
FIG. 3 is a diagram showing a relationship between variations of light quantity and correction values.

Relationship Between Correction for Variation of Light Distribution and Contamination of Reference Member FIG. 3 is a diagram showing a relationship between variations of light quantity (variation of light distribution) and correction values. Although the platen roller 110 will be described here, the same description applies to the platen roller 127.

It is assumed that in an early phase of reading, there is no density non-uniformity on the platen roller 110. Moreover, a reading value as used in the following description refers to a reading value after the shading correction. That is to say, in the early phase (a first original) of reading, there is no difference among reading values P1$a$ through P1$h$ obtained from the platen roller 110. The reading values are the same even though the main scanning positions are different. It should be noted that a reading value at a main scanning position j of an i-th original is expressed as Pij.

Meanwhile, as a plurality of originals is continuously read, the reading values obtained from the platen roller 110 vary. This is caused because the quantity of light from the lamp 119 varies differently at different main scanning positions during continuous lighting of the lamp 119. According to FIG. 3, there are differences among reading values Pna through Pnh obtained from the platen roller 110 in a middle or later phase (an n-th original) of reading. There also is a difference between the reading value in the early phase and the reading value in the middle or later phase at the same main scanning position (temporal variation of light quantity). Furthermore, there also is a difference between the reading values at different main scanning positions in the middle or later phase (spatial variation of light quantity, or variation of light distribution).

In order to correct for the variation of light distribution, the luminance level (density) at each main scanning position needs to be corrected using a correction value according to the amount of variation of the reading value. A correction value Anj at a j-th main scanning position of the n-th original is obtained as a ratio between a reading value p1$j$ obtained from the platen roller 110 immediately before reading of the first original and a reading value Pnj obtained from the platen roller 110 immediately before reading of the n-th original. That is to say, the arithmetic expression of the correction value Anj can be Anj=P1$j$/Pn$j$. FIG. 3 shows correction values Ana through Anh for the n-th original. In FIG. 3, the reading values are sampled by dividing the whole area in the main scanning direction into eight (a through h) parts, but the division number (the number of samples) may be greater or smaller than eight. However, the division number is smaller than the total number of pixels constituting a single line in the main scanning direction.

It should be noted that in terms of accuracy, it is desirable if correction values for all of the pixels can be calculated by acquiring a reading value for each and every pixel. However, correction value calculation processing is performed between processing for reading a preceding image and processing for reading a succeeding image and therefore needs to be performed in a short period of time. As the speed at which the original is conveyed increases, the time available for the correction value calculation processing decreases. Therefore, the whole area in the main scanning direction may be divided into a plurality of regions to determine a common correction value for each region, and the common correction value may be used for a plurality of pixels contained in each region. Alternatively, a correction value may be determined for a pixel located in the center of each region, and correction values for other pixels located in between the central pixel of a region and the central pixel of an adjacent region may be calculated using linear interpolation. Thus, memory reduction, shortening of the correction value calculation time, and other effects can be obtained.

Figure 4:
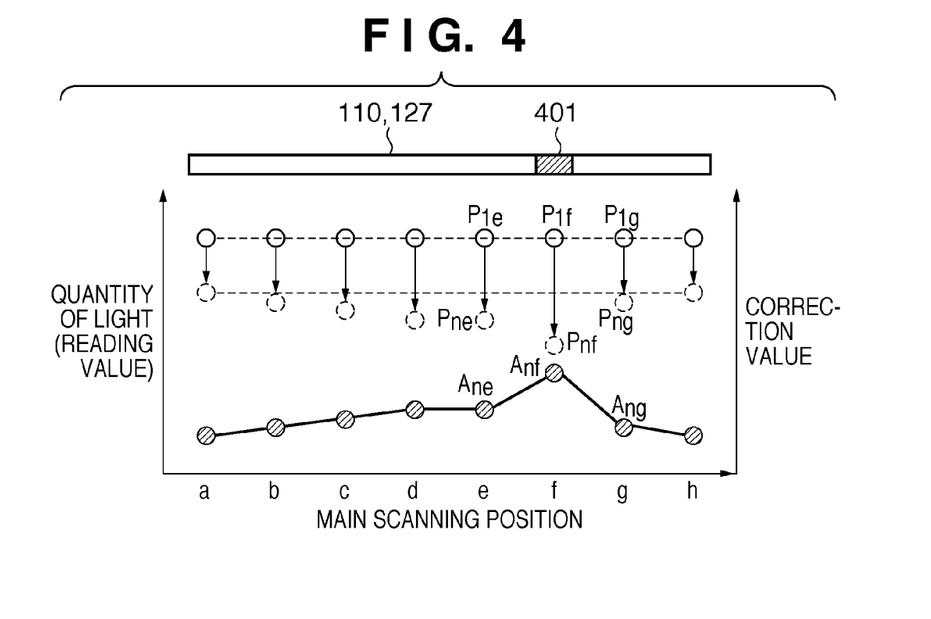
FIG. 4 is a diagram showing a relationship between a variation of light quantity due to unexpected contamination of a platen roller and correction values.

FIG. 4 is a diagram showing a relationship between a variation of light quantity due to unexpected contamination of the platen roller and correction values. According to FIG. 4, a contaminant 401 adheres to a portion of the surface of the platen roller 110 corresponding to a main scanning position f. The contaminant 401 is, for example, ink on an original, an adhesive of a sticky note or the like, or dust stuck to this adhesive. Once the contaminant 401 adheres to the platen roller 110, a reading value Pnf corresponding to the main scanning position f decreases, and consequently, a correction value Anf increases more than necessary.

It should be noted that in the case where correction values for the eight positions are used to calculate correction values for the other main scanning positions by the above-described linear interpolation, the contaminant 401 at the main scanning position f affects even the correction values for the main scanning positions located between the main scanning positions e and g. The reason for this is that with respect to, for example, pixels located between the main scanning positions e and f, respective correction values are determined using a correction value Ane calculated from a reading value Pne and the correction value Anf calculated from the reading value Pnf. In FIG. 4, linear interpolation is employed. Thus, inappropriate correction values are determined for pixels located in the vicinity of the main scanning position f to which the contaminant 401 adheres.

Figure 5:
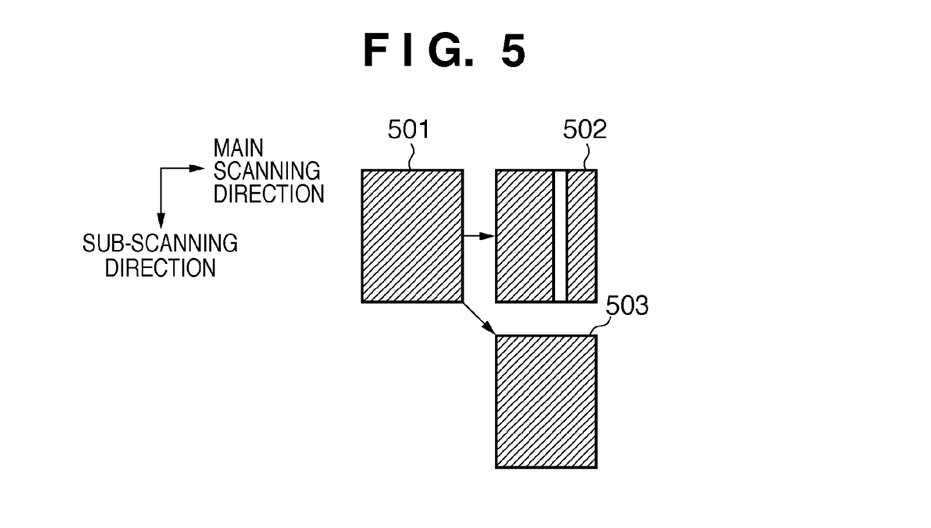
FIG. 5 is a diagram for explaining the influence of a contaminant adhering to the platen roller when first through n-th images of uniform density have been read.

FIG. 5 is a diagram for explaining the influence of a contaminant adhering to the platen roller when the first through n-th images of uniform density have been read. Here, in order to facilitate understanding of the explanation, it is assumed that solid black images of uniform density are formed on the originals. Image data 501 shows image data obtained from the first original. Image data 502 shows image data of the n-th original after the correction for the variation of light distribution, in the case where the contaminant 401 has adhered to the main scanning position f of the platen roller 110. Image data 503 shows image data of the n-th original after the correction for the variation of light distribution, in the case where the contaminant 401 has not adhered.

Since solid images of uniform density are formed on the originals, whether the first original is read or the n-th original is read, image data of uniform density should be obtained as a matter of course. However, as a result of adhesion of the contaminant 401 to the platen roller 110 during reading of an (n−1)-th original, the image data 502 of the n-th original does not have uniform density. The reason for this is that since the correction value for the main scanning position at which the contaminant 401 is present increases more than necessary, the corrected density of the pixel is lighter than it normally should be. As can be seen from FIG. 5, in the case where linear interpolation is performed, band-like brightness non-uniformity (density non-uniformity) occurs.

Principle of Detection of Anomaly Due to Contamination

In the present embodiment, the CCD line sensor 126 reads the platen roller 110 between when a trailing edge of the (n−1)-th original passes through the image reading position on the flowing document reading glass 116 and when a leading edge of the n-th original reaches the image reading position. Reading values Pnj at respective main scanning positions are thus acquired. The CPU 203 determines correction values Anj for respective main scanning positions of the n-th original based on the reading values Pnj. In particular, in the present embodiment, the CPU 203 detects, based on a light quantity correction value A(n−1)j with respect to the (n−1)-th original and a light quantity correction value Anj with respect to the n-th original, an anomaly in the correction value Anj.

Figure 6:
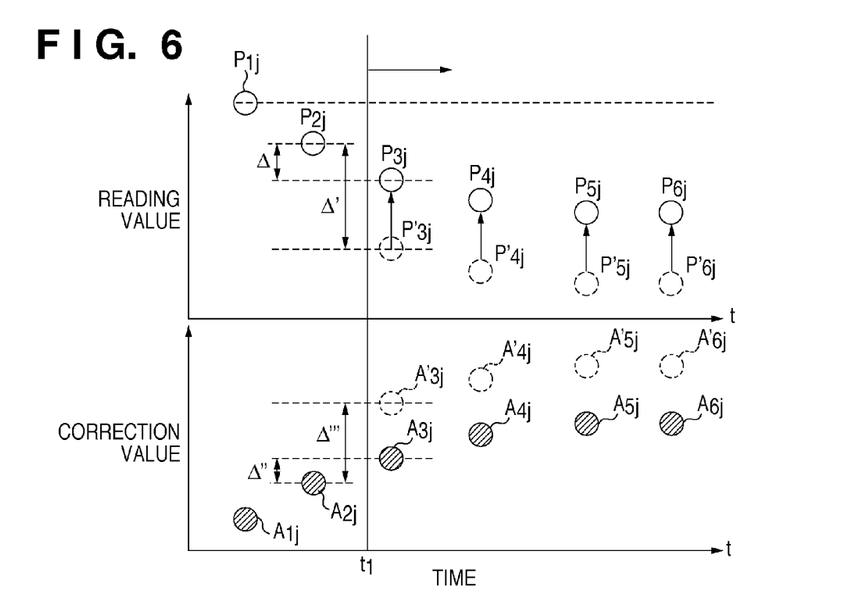
FIG. 6 is a diagram for explaining a method of detecting an anomaly in the quantity of light (a reading value) according to the embodiment.

FIG. 6 is a diagram for explaining a method of detecting an anomaly in the quantity of light (a reading value) according to the embodiment. The horizontal axis represents the time. The vertical axis represents a reading value Pij and a correction value Aij at the j-th main scanning position. It is assumed that unexpected contamination has occurred after time t1 (in FIG. 6, between the second original and the third original).

As shown in FIG. 6, the reading value obtained from the platen roller greatly varies with time in an early phase of continuous reading, and then, the amount of variation decreases from a middle phase to a later phase. However, if an unexpected variation occurs due to contamination, the amount of variation Δ' becomes greater than a normal amount of variation Δ (Δ=P2j−P3j, Δ'=P2j−P'3j).

Thus, a threshold value Th intermediate between Δ and Δ' is set. The CPU 203 determines whether or not the difference between a reading value P(n−1)j with respect to the (n−1)-th original and a reading value Pnj with respect to the n-th original exceeds the threshold value Th. In this manner, the CPU 203 can determine whether or not an unexpected variation of light quantity that requires modification of the correction value Anj has occurred. That is to say, the CPU 203 can detect whether the variation of light quantity is normal or anomalous. The threshold value Th is determined in the design stage of the image reading apparatus by determining, for example, how much the quantity of light from the light source varies with time. It should be noted that assuming that the threshold value Th is a value that can be set freely, it also is possible to deal with variations among different light sources.

Instead of the difference between the reading value P(n−1)j with respect to the (n−1)-th original and the reading value Pnj with respect to the n-th original, attention may also be paid to the difference between the correction value A(n−1)j with respect to the (n−1)-th original and the correction value Anj with respect to the n-th original. As shown in FIG. 6, the correction value Aij at the j-th main scanning position changes in such a manner as A1j, A2j, A3j, A4j, etc. if an expected variation of light quantity does not occur. However, if an unexpected variation occurs, the correction value changes in such a manner as A1j, A2j, A'3j, A'4j, etc. That is to say, the occurrence of the unexpected variation causes the original amount of variation Δ" in the correction value to change to an amount of variation Δ''' (Δ"=A3j−A2j, Δ'''=A'3j−A2j). Accordingly, the CPU 203 can detect an unexpected variation of light quantity by comparing a threshold value Th" intermediate between Δ" and Δ''' with the difference between the correction value A(n−1)j with respect to the (n−1)-th original and the correction value Anj with respect to the n-th original.

Principle of Modification of Correction Value

Figure 7:
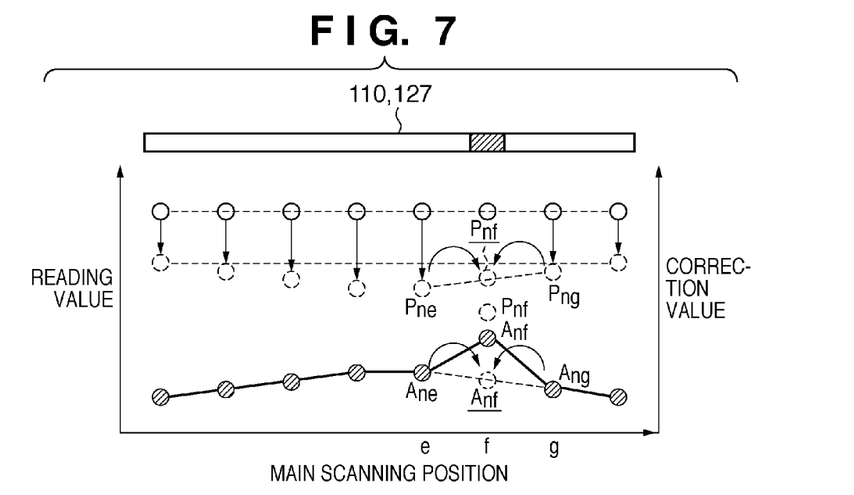
FIG. 7 is a diagram showing the principle of modification of a correction value when an anomaly has been detected.

FIG. 7 is a diagram showing the principle of modification of a correction value when an anomaly has been detected. When an anomaly has been detected in a reading value or a correction value with respect to a specific main scanning position, the CPU 203 discards the correction value for that main scanning position. Then, the CPU 203 modifies the correction value with respect to the specific main scanning position using a correction value for one or more other main scanning positions that are present around the specific main scanning position. That is to say, the CPU 203 determines a modification value for modifying the correction value for the specific main scanning position from correction values for two or more other main scanning positions at which no anomaly has been detected.

According to FIG. 7, an unexpected variation due to contamination of the platen roller has occurred in the reading value Pnf and the correction value Anf at the f-th main scanning position of the n-th original. Thus, the CPU 203 obtains a modification value Cnf from a correction value Ane with respect to the e-th main scanning position and a correction value Ang with respect to the g-th main scanning position, modifies the correction value Anf for the f-th main scanning position, and calculates a modified correction value Anf. The modified correction value Anf=the correction value Anf−the modification value Cnf. It should be noted that the CPU 203 may also determine correction values between the main scanning positions e and g by determining the equation of a straight line passing through the correction value Ane with respect to the e-th main scanning position and the correction value Ang with respect to the g-th main scanning position (linear interpolation). In this manner, linear interpolation is performed using the correction value with respect to the first main scanning position e located forward of the specific main scanning position f and the correction value with respect to the second main scanning position g located rearward of the specific main scanning position f.

It should be noted that the CPU 203 may also modify the reading value with respect to the specific main scanning position using a reading value at one or more other main scanning positions that are present around the specific main scanning position and calculate a correction value using the modified reading. The CPU 203 obtains a modification value Cnf from a reading value Pne with respect to the e-th main scanning position and a reading value Png with respect to the g-th main scanning position, modifies the reading value Pnf at the f-th main scanning position, and calculates a modified reading value Pnf. The modified reading value Pnf=the reading value Pnf+the modification value Cnf. It should be noted that the CPU 203 may also determine the equation of a straight line passing through the reading value Pne with respect to the e-th main scanning position and the reading value Png with respect to the g-th main scanning position and determine the reading value Pnf at the main scanning position f from this equation (linear interpolation). It goes without saying that the correction value calculated from this reading value Pnf serves as the modified correction value Pnf.

Figure 8:
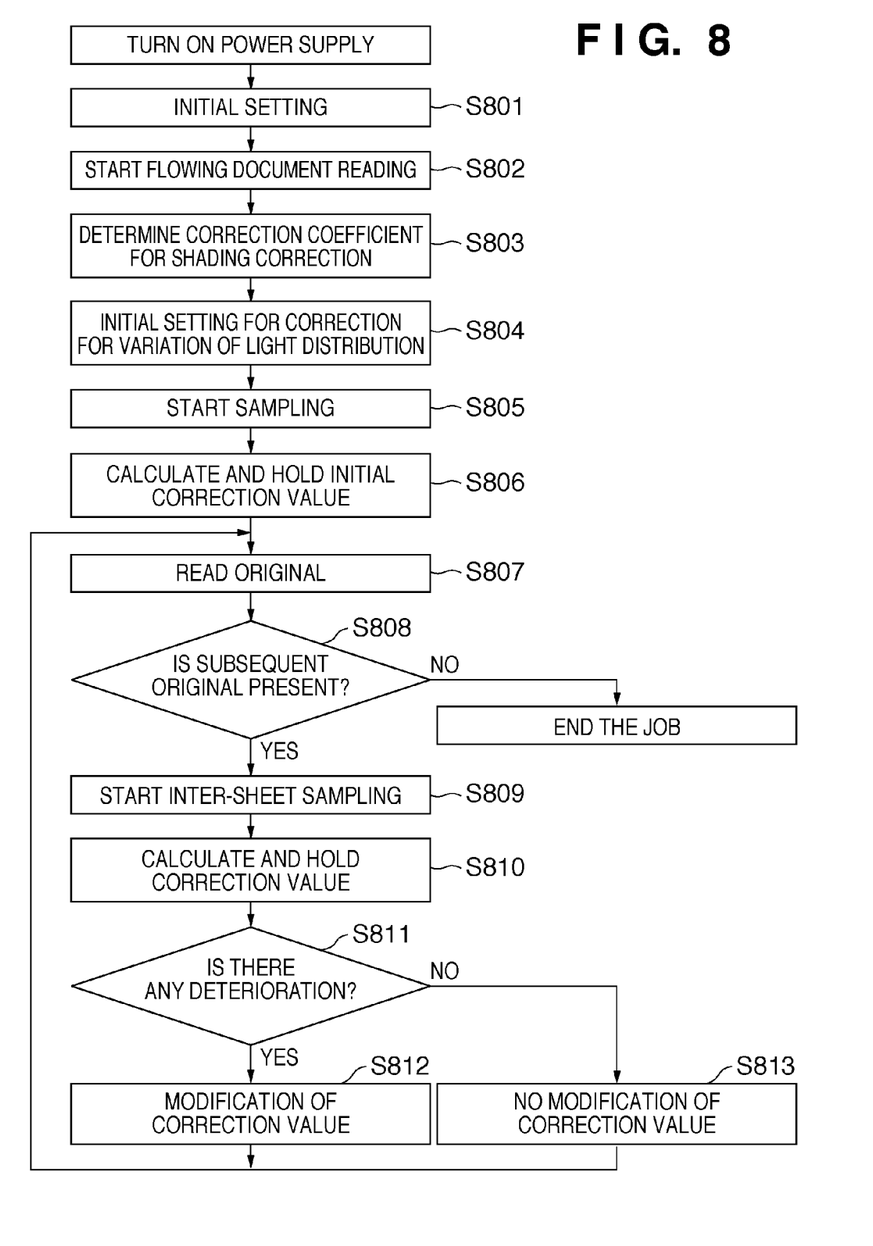
FIG. 8 is a flowchart illustrating the correction for variation of light quantity executed by a CPU according to the embodiment.

FIG. 8 is a flowchart illustrating the correction for variation of light quantity executed by the CPU 203 according to the embodiment. In step S801, the CPU 203 performs overall initial setting of the image reading apparatus. For example, the CPU 203 initializes registers of the CCD line sensor 126, the CIS 128, and the like. In step S802, the CPU 203 starts execution of the flowing document reading mode instructed from an operating unit (omitted from the drawings). In the following description, it is assumed that an image of an original that has been conveyed by the automatic original feeder 100 is read by the CCD line sensor 126 provided in the image reading apparatus main body 117. It should be noted that in the case where reading is performed with the CIS 128 provided in the automatic original feeder 100, the same processing is performed except that the white reference plate for shading correction is different.

In step S803, the CPU 203 moves the first mirror base 123 to just under the white reference plate 114 for shading correction and executes reading of the white reference plate. The CPU 203 determines a correction coefficient for use in shading correction based on the results of this reading. After the correction coefficient for shading correction has been determined, the CPU 203 moves the first mirror base 123 to the image reading position. That is to say, the first mirror base 123 moves to just under the flowing document reading glass 116 and the platen roller 110. It should be noted that the second mirror base 124 also moves following the first mirror base 123. Incidentally, "shading correction" refers to a process for correcting non-uniformity of an image in the main scanning direction due to sensitivity non-uniformity of the sensor, non-uniformity of the light source, or the like. In other words, "shading correction" is a process for calculating a magnification (coefficient) for making digital data obtained through AD conversion uniform in the main scanning direction.

In step S804, the CPU 203 executes initial setting for correction for the variation of light distribution. This initial setting includes, for example, initialization of an initial correction value Z, main scanning positions j with respect to reading values obtained from the platen roller 110, the number of pixels X per line constituting a sample region, the number of lines Y constituting a sample region, and the like.

Figure 9:
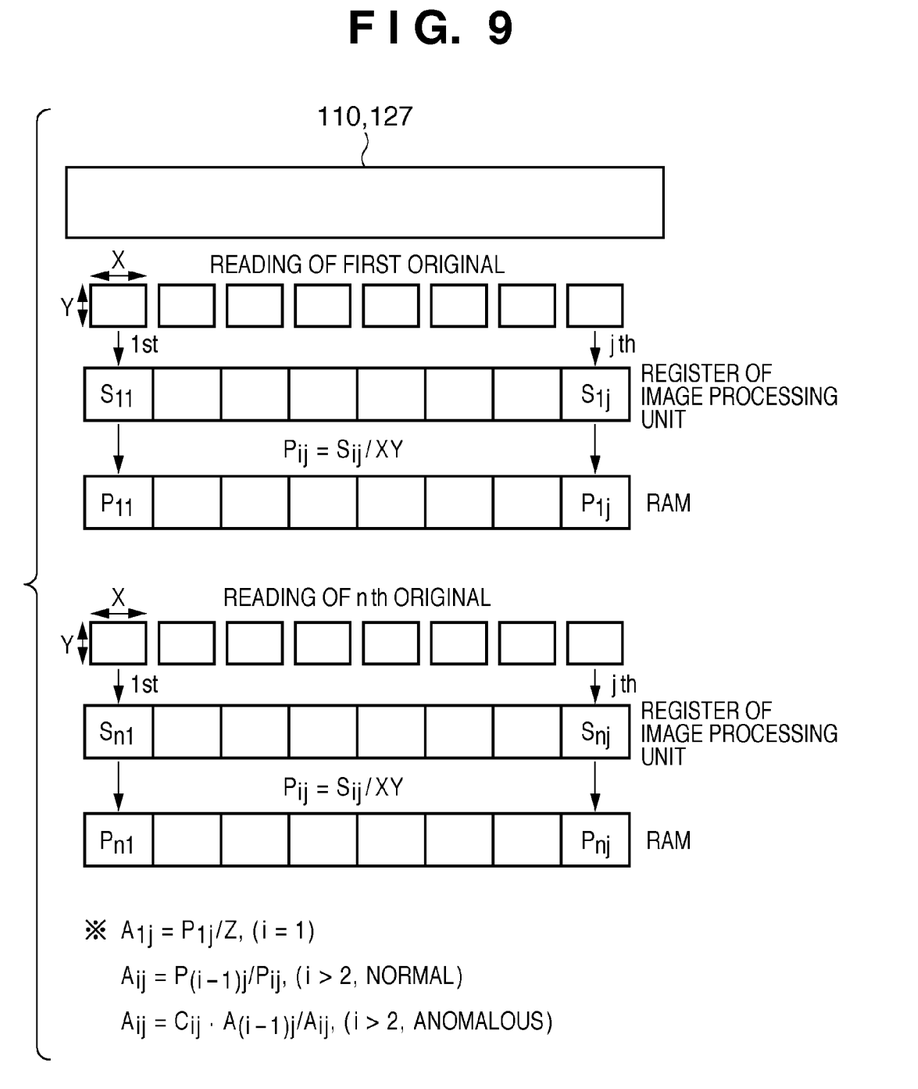

FIG. 9 is a diagram for explaining sample regions, reading values, a process for averaging the reading values, and so on. In the present embodiment, a single sample region is defined by X pixels×Y lines. In other words, a single sample region contains XY pixels. As can be seen from FIG. 9, the main scanning direction of the platen roller is divided into j sample regions. In other words, a single line is constituted by X×j pixels. The Y lines in the sub-scanning direction are taken into account because the platen roller 110 is rotating.

In step S805, the CPU 203 reads (samples) the surface of the platen roller 110 with the CCD line sensor 126 before the passage of the first original. According to FIG. 9, a single sample region is constituted by XY pixels. A reading value obtained from the j-th sample region of the platen roller 110 with respect to the i-th original is defined as Sij. That is to say, Sij is the total of reading values obtained from XY pixels. In this manner, the CPU 203 obtains the sum of reading values for each group of reading elements out of the plurality of reading elements, the groups corresponding to a plurality of sample regions on the reference member. Before the passage of the first original, reading values S11 through S1$j$ of respective sample regions are stored in the register of the image processing unit 202.

In step S806, the CPU 203 stores values P11 through P1$j$ obtained by dividing the reading values S11 through S1$j$ of respective sample regions by the total number of pixels XY into the RAM 205 (Pij=Sij/XY, where i=1 here). Thus, Pij is a mean value (a measure of central tendency) of reading values obtained from respective pixels in the j-th sample region with respect to the i-th original. In this manner, the CPU 203 calculates a mean value by dividing the sum of reading values of each of the reading element groups by the number of reading elements constituting the group. It should be noted that the RAM 205 may be a memory incorporated in the image processing unit 202. Furthermore, the CPU 203 determines correction values A11 through A1$j$ to be applied to the first original by dividing P11 through P1$j$ by a predetermined value Z (A11=P11/Z, A1$j$=P1$j$/Z). In this manner, the CPU 203 determines a correction value for each of the reading element groups from the sum (specifically, the mean value) of reading values of the reading element group. It should be noted that the predetermined value is determined in the design stage. The CPU 203 sets the calculated correction values A11 through A1$j$ in the image processing unit 202.

In step S807, the CPU 203 executes reading of the first original. At this time, the image processing unit 202 corrects for the variation of light distribution by multiplying reading values (digital data) obtained from the original by the correction values A11 through A1$j$ that the CPU 203 has set. In step S808, the CPU 203 determines whether or not a subsequent original to be read is present. For example, the CPU 203 determines whether or not there is a detection signal from an original detection sensor provided in the vicinity of the original platen. If the subsequent original is absent, the reading process is ended. On the other hand, if the subsequent original is present, the process proceeds to step S809. Here, it is assumed that the subsequent original is the n-th original.

In step S809, the CPU 203 reads the surface of the platen roller 110 with the CCD line sensor 126 before the passage of the n-th original. That is to say, the surface of the platen roller 110 is read between when the trailing edge of the (n−1)-th original passes through the image reading position and when the leading edge of the n-th original reaches the image reading position (between sheets). According to FIG. 9, before the passage of the n-th original, reading values Sn1 through Sn$j$ of respective sample regions are stored in the register of the image processing unit 202.

In step S810, the CPU 203 stores values Pn1 through Pn$j$ obtained by dividing the reading values Sn1 through Sn$j$ of respective sample regions by the total number of pixels XY into the RAM 205 (Pij=Sij/XY, where i=1 here). Furthermore, the CPU 203 determines correction values An1 through An$j$ to be applied to the n-th original by dividing P(n−1)1 through P(n−1)$j$ by Pn1 through Pn$j$, respectively (An1=P(n−1)1/Pn1, An$j$=P(n−1)$j$/Pn$j$). The CPU 203 stores the correction values An1 through An$j$ into the RAM 205. The RAM 205 also holds at least immediately preceding correction values A(n−1)1 through A(n−1)$j$. In this manner, the CPU 203 functions as a correction value determination unit that determines the light quantity correction value for each main scanning position of each original based on the reading value obtained by reading the reference member between originals.

In step S811, the CPU 203 compares the correction values with respect to the (n−1)-th original with the correction values with respect to the n-th original for each sample region and determines whether or not an anomaly has occurred. For example, if the difference between A(n−1)$j$ and An$j$ exceeds the threshold value, the CPU 203 determines that an anomaly has occurred and advances the process to S812. In this manner, the CPU 203 functions as an anomaly detection unit that detects, based on a light quantity correction value with respect to a preceding original and a light quantity correction value with respect to a succeeding original, an anomaly in the correction value with respect to the succeeding original, and specifies a main scanning position at which the anomaly occurs.

In step S812, the CPU 203 modifies the correction value that has been determined as anomalous. As described above, the modification of the correction value Aij may be executed by applying linear interpolation to a plurality of normal correction values or may be executed by performing a calculation (multiplication, division, subtraction, addition, etc.) on the modification value Cij and the original correction value Aij. The CPU 203 sets the modified correction values An1 through An$j$ in the image processing unit 202. In this manner, the CPU 203 functions as a modification unit that, upon detection of an anomaly, modifies a correction value for the main scanning position at which the anomaly occurs, out of light quantity correction values with respect to the succeeding original. It should be noted that the CPU 203 may also function as a modification unit that, upon detection of an anomaly, modifies a reading value at the main scanning position at which the anomaly occurs, out of reading values obtained from the reference member with respect to the succeeding original. In this manner, the CPU 203 determines a modification value for each reading element group in which an anomaly has been detected.

On the other hand, if the difference between A(n−1)j and Anj does not exceed the threshold value, the CPU 203 determines that no anomaly has occurred and advances the process to step S813. It should be noted that the threshold value can be set freely and is held in the RAM 205. The threshold value is a value that allows for detection of variation of light quantity due to an unexpected contaminant adhering to the platen roller. In step S813, the CPU 203 sets the unmodified correction values An1 through Anj in the image processing unit 202.

According to the present embodiment, variation of light quantity can be accurately corrected for even when the reference member for use during continuous reading is contaminated. In particular, an anomaly can be accurately detected by determining whether or not the difference between a correction value (a reading value) with respect to a preceding original and a correction value (a reading value) with respect to a succeeding original exceeds the threshold value. The correction value for a specific main scanning position at which an anomaly has been detected is modified based on a correction value for a main scanning position that is present around the specific main scanning position and at which no anomaly has been detected. Accordingly, the influence of the anomaly can be reduced. In particular, the use of linear interpolation makes it possible to realize the modification with a relatively small number of calculations. The modification process needs to be executed in a so-called inter-sheet period, and therefore reduction in the number of calculations is important. The inter-sheet period may be called as a time interval between two adjacent conveyed sheets.

In the embodiment described above, modification is performed by detecting an anomaly mainly based on correction values. However, as mentioned in part of the foregoing description, detection of an anomaly may be performed based on reading values instead of correction values. The CPU 203 functions as an anomaly detection unit that detects, based on a reading value obtained from the reference member with respect to a preceding original and a reading value obtained from the reference member with respect to a succeeding original, an anomaly in the reading value with respect to the succeeding original, and specifies a main scanning position at which the anomaly occurs. Moreover, the CPU 203 functions as a modification unit that, upon detection of an anomaly, modifies a reading value at the main scanning position at which the anomaly occurs, out of reading values obtained from the reference member with respect to the succeeding original, or a correction value for the main scanning position at which the anomaly occurs, out of light quantity correction values with respect to the succeeding original. Furthermore, the CPU 203 functions as a correction value determination unit that determines a correction value using the reading value modified by the modification unit.

The CPU 203 can detect an anomaly by determining whether or not the difference between a reading value obtained from the reference member with respect to a preceding original and a reading value obtained from the reference member with respect to a succeeding original exceeds the threshold value. Moreover, the CPU 203 can modify a reading value with respect to a specific main scanning position using a reading value at one or more other main scanning positions that are present around the specific main scanning position. The CPU 203 may also perform linear interpolation using a reading value with respect to a first main scanning position located forward of the specific main scanning position and a reading value with respect to a second main scanning position located rearward of the specific main scanning position.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-126821, filed May 26, 2009 and 2010-055123, Mar. 11, 2010, which are hereby incorporated by reference herein in their entirety.

What is claimed is:

1. An image reading apparatus comprising:
   a transparent member having transparency;
   a light irradiation unit that irradiates light toward the transparent member;
   an image reading unit that has reading elements aligned in a main scanning direction, which is a direction orthogonal to a direction that an original is conveyed, and that reads an image of the original that is conveyed over the transparent member;
   a reference member that is provided such that the transparent member is provided between the light irradiation unit and the reference member;
   a correction value determination unit that, in a case of continuous reading of a plurality of originals, determines a light quantity correction value for each main scanning position of each original based on a reading value obtained by the image reading unit reading the reference member between when a trailing edge of a preceding original passes through an image reading position of the image reading unit and when a leading edge of a succeeding original reaches the image reading position;
   an anomaly detection unit that detects, based on the light quantity correction value with respect to the preceding original and the light quantity correction value with respect to the succeeding original, an anomaly in the correction value with respect to the succeeding original, and specifies a main scanning position at which the anomaly occurs; and
   a modification unit that, upon detection of an anomaly by the anomaly detection unit, modifies a reading value at the main scanning position at which the anomaly occurs, out of reading values obtained from the reference member with respect to the succeeding original, or a correction value for the main scanning position at which the anomaly occurs, out of light quantity correction values with respect to the succeeding original.

2. The image reading apparatus according to claim 1, wherein the anomaly detection unit determines whether or not a difference between the light quantity correction value with respect to the preceding original and the light quantity correction value with respect to the succeeding original exceeds a threshold value, and thereby detects an anomaly in the correction value.

3. The image reading apparatus according to claim 1, wherein the modification unit performs linear interpolation using a correction value with respect to a first main scanning position located forward of the main scanning position specified by the anomaly detection unit and a correction value with respect to a second main scanning position located rearward of the main scanning position specified by the anomaly detection unit, and thereby determines a light quantity correction value with respect to the main scanning position specified by the anomaly detection unit.

4. The image reading apparatus according to claim 1,
wherein the correction value determination unit obtains a sum of reading values for each group of reading elements out of the plurality of reading elements, the groups corresponding to a plurality of sample regions on the reference member,
the anomaly detection unit performs anomaly detection for each of the reading element groups, and
the modification unit determines a modification value for each reading element group in which an anomaly has been detected.

5. The image reading apparatus according to claim 4, wherein the correction value determination unit calculates a mean value by dividing the sum of reading values of each of the reading element groups by the number of reading elements constituting the group, and determines a correction value for each reading element using the calculated mean value.

6. An image reading apparatus comprising:
a transparent member having transparency;
a light irradiation unit that irradiates light toward the transparent member;
an image reading unit that has reading elements aligned in a main scanning direction, which is a direction orthogonal to a conveying direction of an original, and that reads an image of the original that is conveyed over the transparent member;
a reference member that is provided such that the transparent member is provided between the light irradiation unit and the reference member;
a correction value determination unit that, in a case of continuous reading of a plurality of originals, determines a light quantity correction value for each main scanning position of each original based on a reading value obtained by the image reading unit reading the reference member between when a trailing edge of a preceding original passes through an image reading position of the image reading unit and when a leading edge of a succeeding original reaches the image reading position;
an anomaly detection unit that detects, based on the reading value obtained from the reference member with respect to the preceding original and the reading value obtained from the reference member with respect to the succeeding original, an anomaly in the reading value with respect to the succeeding original, and specifies a main scanning position at which the anomaly occurs; and
a modification unit that, upon detection of an anomaly by the anomaly detection unit, modifies a reading value at the main scanning position at which the anomaly occurs, out of reading values obtained from the reference member with respect to the succeeding original, or a correction value for the main scanning position at which the anomaly occurs, out of light quantity correction values with respect to the succeeding original,
wherein in the case where the anomaly has been detected, the correction value determination unit determines the correction value using the reading value modified by the modification unit.

7. The image reading apparatus according to claim 6, wherein the anomaly detection unit determines whether or not a difference between the reading value obtained from the reference member with respect to the preceding original and the reading value obtained from the reference member with respect to the succeeding original exceeds a threshold value, and thereby detects an anomaly in the reading value.

8. The image reading apparatus according to claim 6, wherein the modification unit performs linear interpolation using a reading value with respect to a first main scanning position located forward of the main scanning position specified by the anomaly detection unit and a reading value with respect to a second main scanning position located rearward of the main scanning position specified by the anomaly detection unit, and thereby determines a reading value with respect to the main scanning position specified by the anomaly detection unit.

9. The image reading apparatus according to claim 6,
wherein the image reading unit is a line sensor that comprises a plurality of reading elements aligned in the main scanning direction, which is the direction orthogonal to the conveying direction of an original, and that reads an image on a line-by-line basis,
the correction value determination unit obtains a sum of reading values for each group of reading elements out of the plurality of reading elements, the groups corresponding to a plurality of sample regions on the reference member, and determines a correction value for each of the reading element groups from the sum of reading values of the reading element group,
the anomaly detection unit performs anomaly detection for each of the reading element groups, and
the modification unit determines a modification value for each reading element group in which an anomaly has been detected.

10. The image reading apparatus according to claim 9, wherein the correction value determination unit calculates a mean value by dividing the sum of reading values of each of the reading element groups by the number of reading elements constituting the group, and determines a correction value for each reading element using the calculated mean value.

* * * * *